Figure 1:
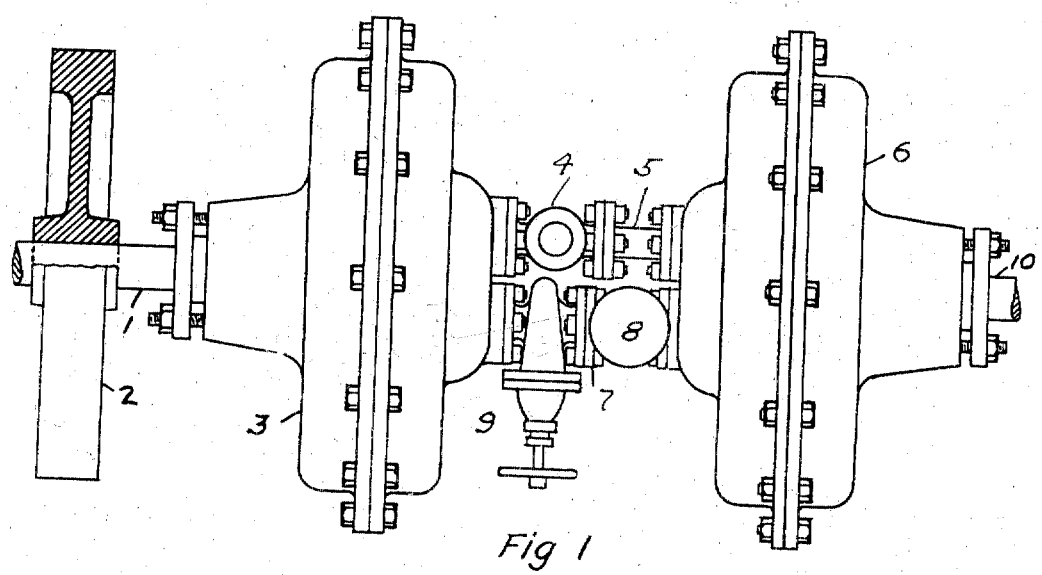

B. C. SHIPMAN.
FLUID GEAR.
APPLICATION FILED JAN. 13, 1915.

1,231,954.

Patented July 3, 1917.

Witnesses:
Fred Suhr
T. J. Geary

Inventor
Bennet Carroll Shipman

UNITED STATES PATENT OFFICE.

BENNET CARROLL SHIPMAN, OF SAN FRANCISCO, CALIFORNIA.

FLUID GEAR.

1,231,954.  Specification of Letters Patent.  Patented July 3, 1917.

Application filed January 13, 1915. Serial No. 2,039.

*To all whom it may concern:*

Be it known that I, BENNET CARROLL SHIPMAN, a citizen of the United States, residing at San Francisco, in the county of San Francisco and State of California, have invented certain new and useful Improvements in Fluid Gears, of which the following is a specification.

My invention has for its object the production of a gear by which any ratios of speeds can be secured between a driving and driven shaft with a corresponding change of torque.

Heretofore all devices for mechanically changing speeds have labored under one of two objections, either they give only certain definite ratios of speed change with correspondingly inversely proportional torques, of which lathe gearing is the type, or they give indefinite ratios of speed change, but only one torque, of which the friction change gear is the type. A satisfactory gear must give both an indefinite ratio of speed changes and at the same time give a torque inversely proportional to the speed change.

My invention accomplishes this result by utilizing the inertia of a moving mass attached to the driving member storing energy through one part of its motion, and transferring it to the driven member through another part of its motion, thus increasing the intensity of motion transmitted, and correspondingly diminishing the amount of motion imparted. It will be evident that if the driving member stores no energy but delivers it continuously at all times to the driven member, there will be no gear action, as the torque from the driver to the driven member will be the same and therefore equal, and the gear ratio will be unity, in other words the speeds will be the same. If however the driving member stores energy during one-half of its movement, and delivers both its stored energy and its normal energy during the second half of its movement, the intensity of such delivery will be double its normal, in other words the torque will be twice, but the motion imparted will be one-half, the characteristics of a true gear. So also if the period were taken as one-quarter or three-quarters or any other fractional period. Thus I can make any gear ratio desired from unity to infinity and by a uniform graduation.

The means of accomplishing this result are essentially a driving shaft carrying a suitable fly wheel, a pump driven thereby, adapted to deliver a fluid through a check valve to a fluid-operated motor attached to the driven shaft, the discharge of which motor after passing through a throttle valve returns to the pump as a suction. In the discharge-suction pipe should be a storage chamber sufficiently large to accommodate the contents of the pump and in certain cases, when desired, of the motor also. With the throttle valve wide open, the fluid will circulate freely in the closed system, and with pump and motor of equal capacity, the driving and driven speeds will be the same, the fly wheel in this case performing no function. If the throttle valve be partially closed, so that the pump is able to draw but a portion of its capacity, a correspondingly inverse portion of its operation will be on vacuum and therefore without load, the excess energy of the shaft being absorbed by the fly wheel. As the pump draws only a portion of its capacity it delivers only the same amount to the motor, hence the motor must run at a reduced speed, but at a greater torque by the added amount of the stored energy of the fly wheel superimposed on the normal energy of the driving shaft, both delivered to the pump in its correspondingly shortened period of working.

Figure 2:
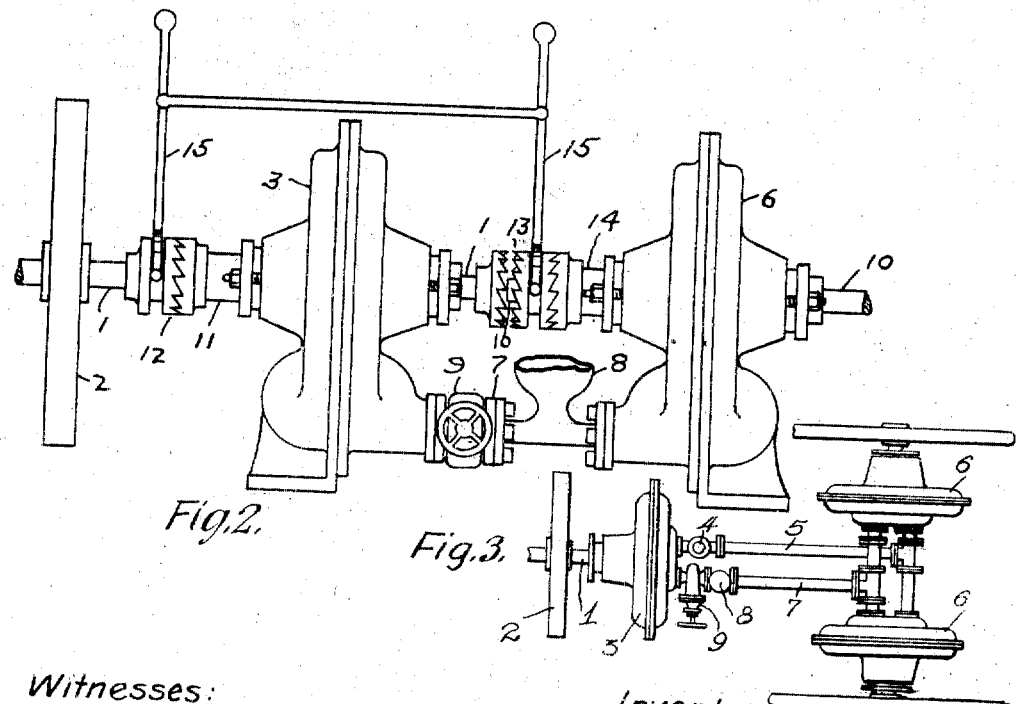
Figure 3:
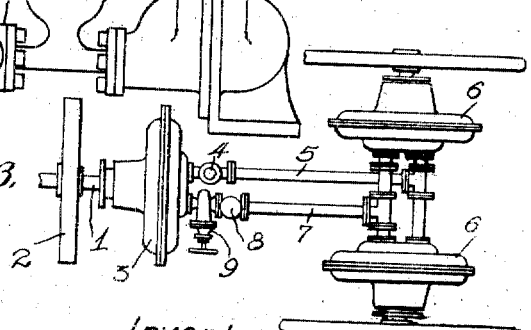

Figure 1 is the simple form of my invention, showing the essential elements in plan. Fig. 2 is a more elaborate modification in side elevation, showing a means of cutting out the fluid apparatus, when the ratio is unity. Fig. 3 shows an application of the invention to a plurality of motors.

Describing my invention in detail, Fig. 1 shows a simple form in which 1, is a driving shaft, 2, a fly wheel on same, 3, any suitable pump attached by any means to said shaft, in this case a rotary pump, 4, a check valve at the delivery of said pump, 5, a discharge line from pump to motor, 6, a suitable motor operatable by fluid under pressure, in this case a rotary motor similar to the pump, 7, an exhaust line back to the suction of the pump, 8, a storage chamber connected to the said exhaust line, 9, a throttle valve for regulating the amount of fluid allowed to reach the pump, 10, a driven shaft attached by any suitable means to the aforesaid fluid motor.

If it be assumed that a load is thrown on the driven shaft, which cannot be pulled by the said shaft at some given speed and torque, it will be evident that by throttling, the amount of fluid admitted to the pump can be reduced to such a point that it will cause the motor to run at some lower speed, at which the load can be pulled if the torque has risen in proportion to the reduction in speed. The torque will so rise, for the reason that, if throttled, the pump during part of the revolution is delivering no energy to the fluid and thence to the motor, but such energy is being stored in the fly wheel, while during that portion of the revolution when the pump is delivering energy to the fluid and thence to the motor, the energy of the fly wheel is being delivered up again and added to the constant energy of the driving shaft, thus increasing the pressure of delivery from the pump which in turn causes a greater torque on the motor. The above variation of speed and torque can be effected down until the speed of the driven shaft reaches zero, when the throttle valve will be entirely closed, the pump working on a vacuum, and therefore consuming no power except for internal friction, while the motor and fluid are at rest, and the amount of fluid normally required to fill the pump is in the storage chamber, 8.

Fig. 2 shows a modification of my invention, in which provision is made for using a direct drive when the gear ratio is unity, thus cutting out of operation the pump and motor, when it is desired to realize the maximum efficiency for periods of long runs. The same numbers refer to similar parts, and in addition the following: 11, a quill to which the operating member of the pump is connected, the driving shaft, 1, passing through such quill. On the end of the quill next to the driving end is attached the fixed clutch member of the clutch, 12, the movable member being slidably attached to the driving shaft, 1, in the well understood manner of jaw clutches. The operating member of the fluid motor is likewise connected to a quill, 14, through which the driven shaft, 10, extends and terminates in close proximity to the driving shaft, 1. On the driving shaft, 1, and on the quill, 14, of the motor are attached two fixed clutch members of the double acting clutch, 13, so arranged that the movable member of said clutch, mounted slidably on the driven shaft, 10, may engage alternately either fixed clutch member, in a well understood manner. The sliding members of both clutches are controlled by shifting mechanism, 15, so arranged that both said members travel in unison and in the same direction.

In starting operation, as shown, the shifting lever would be in such position that the clutch, 12, connects the driving shaft with the quill of the pump and the clutch, 13, connects the driven shaft with the quill of the motor. When the throttle is wide open and both shafts are turning at the same speed, a movement of the shifting lever in the direction of the driving shaft will disengage the driving shaft from the quill of the pump and engage the driving shaft with the driven shaft directly, at the same time disengaging the driven shaft from the quill of the motor. In this way the drive will be straight through, and the pump and motor will be idle, thus economizing the internal losses of that apparatus and the fluid.

The rotary valveless type of pump or motor, a number of which are on the market and are well understood, is indicated and therefore details of such apparatus are not shown, forming no part of this invention. This type of apparatus lends itself particularly to this form of construction, but I do not limit myself to such types. Any suitable pump and motor could be substituted without departing from the spirit of my invention.

It is evident that the pump could drive more than one motor if desired, and at any desired speeds, by simply attaching such motors in a similar manner to the one shown, and making their capacities in inverse proportion to the speeds desired, for a given pump speed. Thus a change gear can be built to control more than one driven shaft, and at the same time allow a variation in speeds between the driven shafts, as for instance in the rear wheels of an automobile. Such an arrangement would not only provide a change gear, but also a differential gear.

Having described my invention, I desire to secure by Letters Patent, and claim:

1. A speed changing mechanism comprising a driving shaft, a moving mass of relatively large inertia connected thereto, a fluid pump driven thereby, a check valve in the discharge of said pump, a fluid motor connected to said discharge and to a driven shaft, the exhaust of said motor connected to the suction of said pump, a storage chamber connected to said exhaust, and a regulating valve interposed in said suction between the pump and said storage chamber.

2. A speed changing mechanism comprising a driving shaft, a mass of relatively large inertia mounted thereon, a positive displacement fluid pump connected thereto, a supply of suitable fluid, a check valve in the discharge of said pump, a positive displacement fluid motor connected to said discharge and attached to a driven shaft, the exhaust from said motor connected to the suction of said pump, a storage chamber connected to the said exhaust, and a valve adapted to regulate the supply of fluid to the suction of the pump.

3. A hydraulic gear comprising a driving shaft, a flywheel mounted thereon, a positive displacement pump connected thereto, a positive displacement motor connected to a driven shaft, a supply of liquid, a connection from the discharge outlet of the said pump to the admission inlet of said motor, a check valve in said connection, a connection from the exhaust outlet of said motor back to the suction inlet of said pump, a storage chamber connected thereto and a valve therein between said storage chamber and said suction inlet adapted to regulate the amount of liquid admitted to such suction inlet.

4. A hydraulic gear comprising a driving shaft, a flywheel thereon, a rotary positive displacement pump connected thereto, a rotary positive displacement liquid motor connected to a driven shaft, a connection from the discharge of said pump to the admission inlet of said motor, a check valve in said discharge connection, a connection from the exhaust outlet of said motor to the suction inlet of said pump, a storage chamber connected thereto, a valve connected therein between said storage chamber and said suction inlet, adapted to control the amount of liquid admitted to such suction inlet, and a supply of suitable liquid sufficient to fill the pump, motor, and connecting lines.

5. A hydraulic gear comprising a driving shaft, a flywheel connected thereto, a fluid pump driven thereby, a connection from the discharge of said pump to the admission ports of one or more fluid motors, a check valve in the discharge of said pump, a connection from the exhaust of said motor or motors to the suction inlet of said pump, a storage chamber connected thereto, and a valve controlling the suction of said pump.

6. A speed changing mechanism comprising a driving shaft, a flywheel connected thereto, a clutch thereon adapted in one position to engage a quill thereon, a fluid pump operatively connected to said quill, a driven shaft, a clutch thereon adapted in one position to engage a quill thereon and in another position to engage the said driving shaft direct, a fluid motor operatively connected to said quill on driven shaft, a fluid connection between discharge of said pump and admission port of said motor having a check valve therein, a fluid connection between exhaust port of said motor and suction of said pump, having a storage chamber connected thereto, and a regulating valve therein, with means for operating said clutches simultaneously.

7. A fluid gear comprising a pump, a check valve, a fluid motor, a receiving chamber, and a throttle valve, connected in a closed circuit in the order named, the pump being mechanically connected to a driving shaft, and a flywheel, and the motor being mechanically connected to a driven shaft.

BENNET CARROLL SHIPMAN.

Witnesses:
H. V. HONN,
FRED SUHR.